(12) United States Patent
Lu et al.

(10) Patent No.: US 12,044,602 B2
(45) Date of Patent: Jul. 23, 2024

(54) SAMPLE PREPARATION METHOD OF GROUTING CONSOLIDATION BODY WITH INTERNAL DEFECTS

(71) Applicant: Wuhan University, Wuhan (CN)

(72) Inventors: Haifeng Lu, Wuhan (CN); Quansheng Liu, Wuhan (CN); Yuexiu Wu, Wuhan (CN); Xiaoxuan Kong, Wuhan (CN); Aide Cao, Wuhan (CN); Jinlong Yi, Wuhan (CN); Zhichao Wei, Wuhan (CN)

(73) Assignee: Wuhan University

( * ) Notice: Subject to any disclaimer, the term of this patent is extended or adjusted under 35 U.S.C. 154(b) by 366 days.

(21) Appl. No.: 17/370,041

(22) Filed: Jul. 8, 2021

(65) Prior Publication Data

US 2022/0011199 A1    Jan. 13, 2022

(30) Foreign Application Priority Data

Jul. 8, 2020   (CN) .......................... 202010652381.7

(51) Int. Cl.
*G01N 1/28*   (2006.01)
*G01N 1/08*   (2006.01)
*G01N 1/10*   (2006.01)
*G01N 1/36*   (2006.01)

(52) U.S. Cl.
CPC ................ *G01N 1/28* (2013.01); *G01N 1/08* (2013.01); *G01N 2001/1025* (2013.01); *G01N 2001/1068* (2013.01); *G01N 2001/366* (2013.01)

(58) Field of Classification Search
CPC .... G01N 1/28; G01N 1/08; G01N 2001/1025; G01N 2001/1068; G01N 2001/366; G01N 1/36; G01N 2203/0019; G01N 3/00; G01N 2203/0298; G01N 1/2806; G01N 2001/2893
USPC ............ 73/866.4, 1.86, 1.89, 1.01, 788–854; 264/40.1
See application file for complete search history.

(56) References Cited

U.S. PATENT DOCUMENTS 4,704,892 A * 11/1987 Tarnai .................... G01N 29/30
                                                  378/207
4,843,866 A *  7/1989 Madsen ................ G01H 3/005
                                                  73/1.86

FOREIGN PATENT DOCUMENTS

CN            110006717 A  *  7/2019

* cited by examiner

*Primary Examiner* — Robert R Raevis
(74) *Attorney, Agent, or Firm* — Jose Cherson Weissbrot (57) ABSTRACT

The present application discloses a grouting consolidation sample containing internal defects and the preparation method thereof. Firstly, plasticine is employed to prepare a wax model with the desired defect shape, then a fixing device is used to fix the wax model onto a specific position in a casting mould of consolidation and thereafter a slurry is poured to form a grouting consolidation sample, after the grouting consolidation sample reaches the predetermined strength, the grouting consolidation sample containing the wax model is put into an oven to heat at a temperature above the melting point of wax to demolish the structure of the wax model to form a grouting consolidation sample with internal defects.

9 Claims, 11 Drawing Sheets

SAMPLE PREPARATION METHOD OF GROUTING CONSOLIDATION BODY WITH INTERNAL DEFECTS

CROSS REFERENCE TO RELATED APPLICATION

The present application claims priority to Chinese patent application No. 202010652381.7, entitled "Sample Of Grouting Consolidation Body With Internal Defects And Preparation Method Thereof", filed on Jul. 8, 2020, the entire content of which is incorporated herein by reference.

TECHNICAL FIELD

The application belongs to the field of research on the mechanism of grouting and reinforcement of fractured rock masses, and relates to a method for preparing built-in defects, in particular to a grouting consolidation sample containing internal defects and a preparation method thereof. Various shapes can be prepared according to research and test requirements. The grouting consolidation sample with internal defects meets the needs of experimental research on grouting reinforcement mechanism and provides new methods and ideas for grouting reinforcement research in geotechnical engineering.

BACKGROUND

Grouting is a commonly used reinforcement method in geotechnical engineering. However, the actual grouting engineering is difficult to achieve the expected results. The formed grouting consolidation generally has a large number of defects, such as cracks, holes, etc., randomly distributed in the grouting consolidation, that is, the defect-containing grouting consolidation is formed. The failure of grouting and solid is actually the failure of the consolidation with defects. Defects have a huge influence on the mechanical properties and deformation and failure characteristics of the consolidation. Therefore, research on the characteristics of the grouting consolidation with defects is also increasingly urgent. Limited by the conditions of sample preparation, little research work in this field has been done on the strength, failure mechanism and its influencing factors of the grouting consolidation with internal defects, and there is a need for a sample that can prepare the grouting consolidation samples with internal defects. The preparation method to promote the development of research in this direction.

SUMMARY

The purpose of the present application is to solve the problems in the prior art and discloses a method for preparing a grouting consolidation sample containing internal defects, in a bid to tackle the problem in the prior art that it is difficult to simulate natural defects for preparing internal defects.

In order to solve the aforementioned technical problem, the technical solutions employed by the present application are as follows:

A method for preparing a grouting consolidation sample containing internal defects encompasses the following steps:

Step 1: Use a tool to carve a groove in the shape of the defect to be prepared on plasticine to form a defect mould, and then place one end of a string of wool at the centre of the groove;

Step 2: Heat the low-melting point material to melt, and pour the melted low-melting point material in liquid form into the groove in the plasticine;

Step 3: After the low-melting point material is cooled and thereafter solidified to form a defect model, take out the defect model with the wool string, and fix the defect model onto a casting mould of consolidation using the string according to the requirements of the design of the experiment;

Step 4: Slowly inject evenly stirred slurry along the edge of the casting mould of consolidation while keeping the position of the defect model unchanged;

Step 5: After the slurry reaches the slurry's solidification time as designed by the experiment, remove the casting mould of consolidation, and place the sample into an oven to heat at a temperature above the melting point of the low-melting point material;

Step 6: Take out the sample and the preparation for a grouting consolidation sample containing internal defects is finished.

Further, the said tool is a steel ball, a steel column or a steel sheet.

Further, the said groove has a shape of a hemisphere, a hemispheric-column combination, a sheet or an irregular groove.

Further, the melting point of the said low melting-point material ranges from 40 degrees to 90 degrees.

Further, the low melting point material is one selected from the group consisting of paraffin, asphalt, rosin and their combination.

Further, in step 2, a metal container is employed to contain the low-melting material, and the bottom of the metal container is heated by an alcohol burner to melt down the low-meting point material.

Further, in step 5, The oven temperature is 100-120 degrees.

Further, in step 5, the sample is heated for 1-5 hours.

Further, the equivalent diameter of the defect model is 1-8 mm.

According to a second embodiment, a grouting consolidation sample containing internal defects is provided, which is prepared by the said preparation method.

The advantages and effects of the application are as follows:

It prepares a grouting consolidation sample with internal defects, which compensates for the deficiency of the grouting reinforcement mechanism research, and provides a reference for comprehensively and effectively revealing the grouting reinforcement mechanism of fractured rock mass.

Varied forms of internal defects can be prepared based on the requirements of the experiment to meet the need of specimens for grouting reinforcement mechanism research under different working conditions.

BRIEF DESCRIPTION OF THE DRAWINGS

FIG. 6(*a*) is a schematic diagram of a grouting consolidation sample provided by one embodiment of the present application.

FIG. 6(*b*) is a schematic diagram illustrating the position of a single-hole defect of a grouting consolidation sample provided by the second embodiment of the present application.

FIG. 6(*c*) is a schematic diagram illustrating the position of the other single-hole defect of a grouting consolidation sample provided by the second embodiment of the present application.

FIG. 6(*d*) is a schematic diagram illustrating the position of another single-hole defect of a grouting consolidation sample provided by the second embodiment of the present application.

FIG. 7(*a*) is a schematic diagram illustrating the position of a double-hole defect of a grouting consolidation sample provided by the second embodiment of the present application.

FIG. 7(*b*) is a schematic diagram illustrating the position of a three-hole defect of a grouting consolidation sample provided by the second embodiment of the present application.

FIG. 7(*c*) is a schematic diagram illustrating the position of the other three-hole defect of a grouting consolidation sample provided by the second embodiment of the present application.

FIG. 7(*d*) is a schematic diagram illustrating the position of another three-hole defect of a grouting consolidation sample provided by the second embodiment of the present application.

FIG. 7(*e*) is a schematic diagram illustrating the position of the other double-hole defect of a grouting consolidation sample provided by the second embodiment of the present application.

FIG. 7(*f*) is a schematic diagram illustrating the position of the three-hole defect of a grouting consolidation sample provided by the second embodiment of the present application.

FIG. 13(*a*) is a schematic diagram of the three-hole defect sample in the present application.

FIG. 13(*b*) is a schematic diagram of another three-hole defect sample in the present application.

FIG. 14(*a*) is a schematic diagram of the tow-hole defect sample in the present application.

FIG. 14(*b*) is a schematic diagram of another tow-hole defect sample in the present application.

FIG. 15(*a*) is a schematic diagram of the diagonal hole defect sample in the present application.

FIG. 15(*b*) is a schematic diagram of another three-hole defect sample in the present application.

In the Figures, 1—casting mould of consolidation; 2—spherical wax mould; 3—a string of wool; 4—slurry; 5—sheet—shaped wax mould; 6—plasticine; 7—steel ball; 8—steel sheet.

DESCRIPTION OF THE EMBODIMENTS

For those skilled in the art to understand and implement the present application, drawings and examples are used to describe the present disclosure in further detail below. The exemplifying embodiment described herein is only for the instruction and explanation of the present application, but not to be used to restrict the present application.

Hereinafter, the present application will be described by taking paraffin wax as an example of the low-melting point material.

Figure 3:
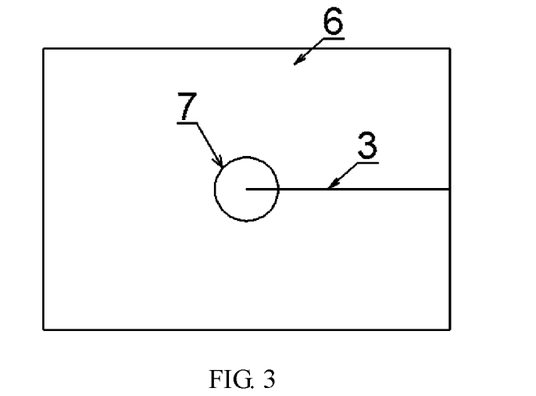
FIG. 3 is a schematic diagram of the preparation method of the spherical wax mould in the first embodiment of the present application.
Figure 4:
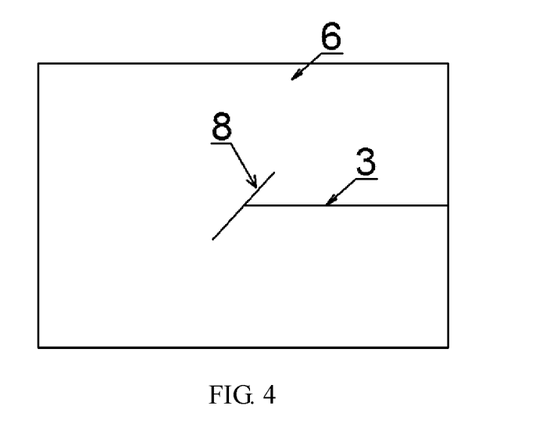
FIG. 4 is a schematic diagram of the preparation method of the sheet-shaped wax mould in the first embodiment of the present application.

By reference to FIGS. 1 to 4, the present application discloses a method of preparing a grouting consolidated body sample containing internal defects, which comprises:

Step 1: Use the steel ball 7 (the size is calculated based on the experimental requirements; the diameter is about 2-5 mm) to carve a spherical or steel-shaped groove on plasticine 6, and then place one end of a string at the centre of the spherical or steel-shaped groove.

Step 2: Place paraffin wax in a metal container, heat the paraffin wax with an alcohol burner to melt, and pour the melted paraffin wax liquid into the groove in the plasticine 6.

Figure 1:
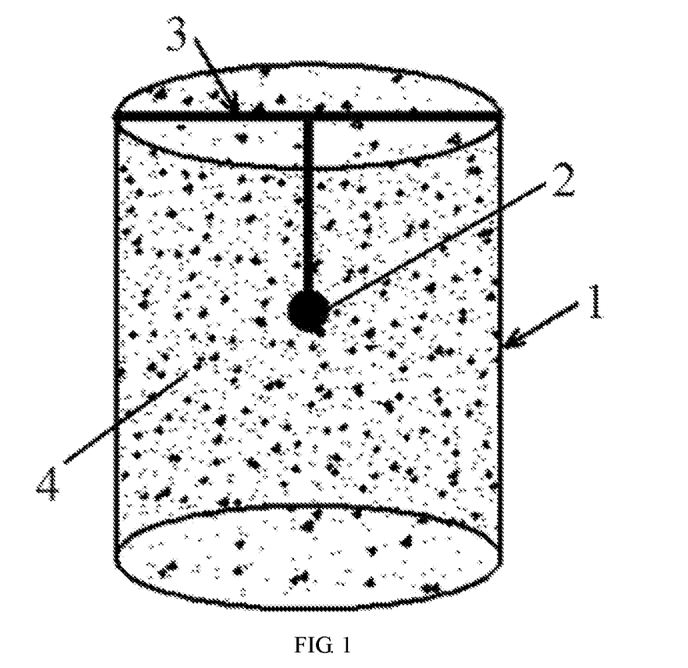
FIG. 1 is a schematic diagram of the structure of a grouting consolidation sample containing spherical internal defects prepared in the first embodiment of the present application.
Figure 2:
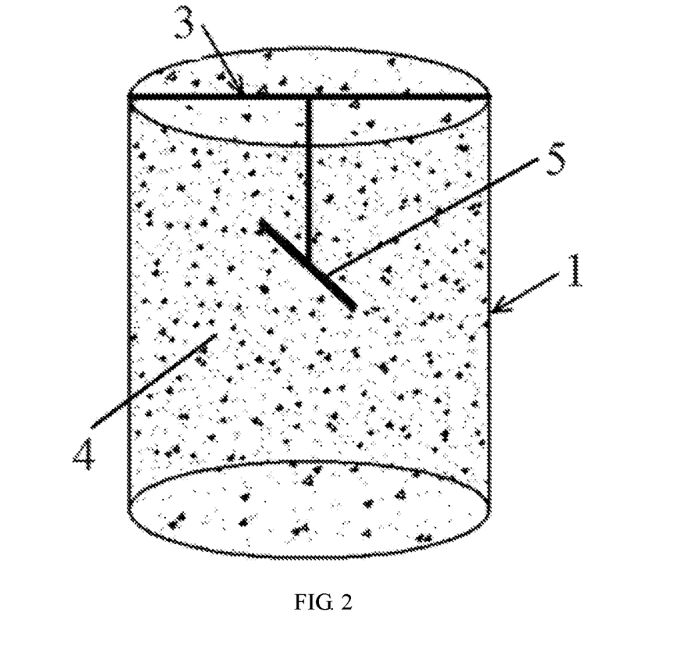
FIG. 2 is a schematic diagram of the structure of a grouting consolidation sample containing sheet-shaped internal defects prepared in the first embodiment of the present application.

Step 3: After the paraffin wax is cooled and thereafter solidified, take out the paraffin wax model (spherical paraffin wax model 2 or steel-shaped paraffin wax model 5) with the string of wool 3, and fix the paraffin wax model onto a casting mould of consolidation body 1 (the size of the mould is determined according to the experimental requirements, generally it is cylindrical with a diameter of 50 mm and a height of 100 mm) through the string of wool according to the requirements of the experimental design.

Step 4: Slowly inject evenly stirred slurry 4 (according to the experimental design water-cement ratio configuration) along the edge of the casting mould 1 of consolidation body while keeping the position of the paraffin wax model (spherical paraffin wax model 2 or steel-shaped paraffin wax model 5) unchanged (by slowing injecting slurry or fixing with the string at multiple angles.)

Step 5: After it reaches the solidification time (this can be 7 days, 15 day, 28 days etc.) of slurry 4 as designed by the experiment, remove the casting mould of consolidation 1, and place the sample into an oven to heat at a temperature of 100-120° C. for 1-5 hours.

Figure 5:
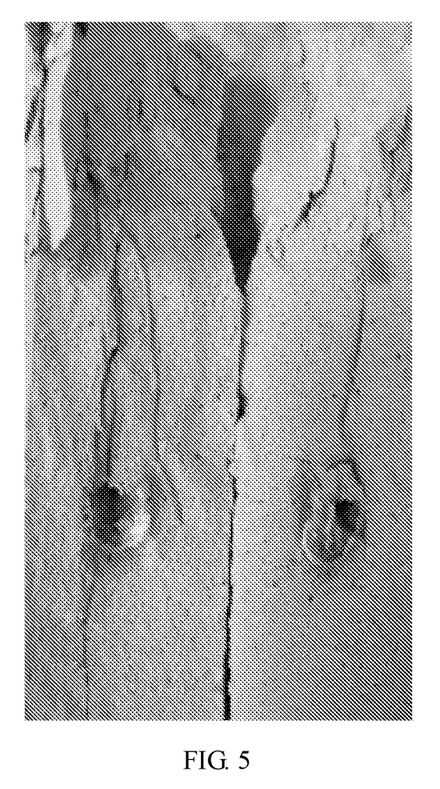
FIG. 5 is a cross-sectional view of a grouting consolidation sample containing internal defects prepared in the first embodiment of the present application.

Step 6: Take out the sample and the preparation for a grouting consolidated body sample containing internal defects is finished.

In this embodiment, paraffin with a low melting point (the melting point is about 49-51° C.) is used as the prefabricated material for internal defects that can form internal defects without damaging the external structure of the grouting consolidation body, making it closer to the real rock condition.

Through exploratory experiments, the preparation method of a grouting consolidation sample containing internal defects is determined, and then the test plan of the research topic is designed. This experiment mainly studies the influence of factors such as the relative position of pore defects in the rock sample and the number of holes on the mechanical properties of grouting consolidation. In terms of relative position, a grouting consolidation sample of holes in the standard cylindrical specimen (diameter 50 mm, height 100 mm) in the vertical axis, the horizontal axis and the 45° diagonal line through the centre of the cylinder is designed and prepared. In terms of the number of holes, 3 defect samples containing 0, 1, 2, and 3 holes are prepared in combination with relative positions.

After the grouting consolidation samples containing holes and defects in various states are successfully prepared, they are cured in the same natural environment for the same amount of time, and then the mechanical properties of the grouting consolidation samples are tested, and the tests of the grouting consolidation samples in various states are recorded and sorted. With such parameters as elastic modulus E and peak compressive strength P, etc., draw stress-strain curves and observe their failure curves and laws. Afterwards, observe the entire failure process, record the failure morphology of the special state, observe the grouting consolidation sample after failure, especially the fracture morphology and crack development at the pores, and then analyze the impact of the hole defects on the grouting consolidation mechanics performance impact.

Figure 6A:
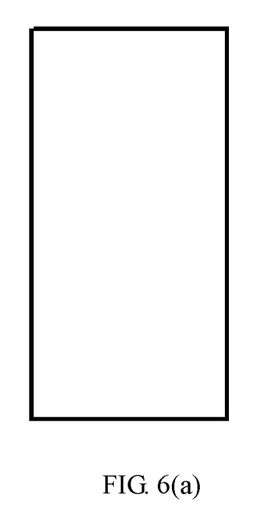
Figure 6B:
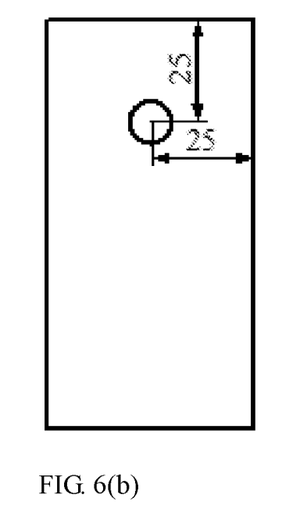

Single-hole sample preparation: There are 13 single-hole grouting consolidation samples. No. 1-1, 1-2, 1-3 grouting consolidation sample is a cylinder with a string of wool placed on the central axis, as shown in FIG. 6(a); 1-5, 1-6, Specimen No. 1-7 is a hole defect at the centre of the cylinder at 25 mm from the top surface, as shown in FIG. 6(b); Specimen No. 1-8, 1-9, and 1-10 are hole defects at the central axis of the cylinder.

Figure 6C:
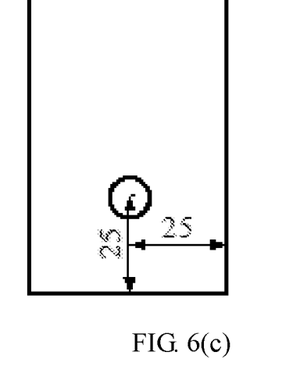
Figure 6D:
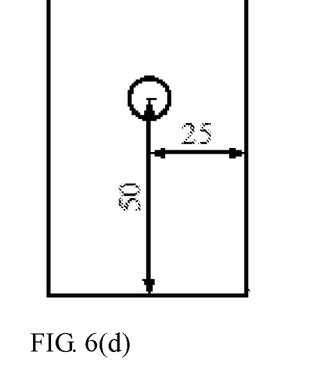

The upper hole centre is 25 mm from the bottom surface, as shown in FIG. 6(c); No. 1-4, 1-11, 1-12, and 1-13 grouting consolidation specimens are hole defects at the centre point of the cylinder, as shown in FIG. 6(d).

Grind both ends of the sample with a hand grinder, without protrusions, etc., to avoid stress concentration during uniaxial compression. Accurately measure the size and quality of the sample: vernier caliper (precision 0.01 mm), electronic scale (precision 0.01 g). The measurement results are shown in Table 1.

TABLE 1

Single hole defect sample parameters

| No. | Size(Diameter mm & Height mm) | Mass/g | Time/d |
|---|---|---|---|
| 1-1 | 50.65 × 100.82 | 321.3 | 10 |
| 1-2 | 50.66 × 99.63 | 325.5 | 13 |
| 1-3 | 50.60 × 99.69 | 326.9 | 13 |
| 1-5 | 50.67 × 99.75 | 325.9 | 13 |
| 1-6 | 50.55 × 100.01 | 324.0 | 10 |
| 1-7 | 50.55 × 97.55 | 317.8 | 13 |
| 1-8 | 50.51 × 99.19 | 317.6 | 13 |
| 1-9 | 50.58 × 98.58 | 315.8 | 10 |
| 1-10 | 50.60 × 99.82 | 321.5 | 13 |
| 1-11 | 50.61 × 99.49 | 319.6 | 10 |
| 1-12 | 50.55 × 98.80 | 316.3 | 10 |
| 1-13 | 50.60 × 97.62 | 311.1 | 13 |

Figure 7A:
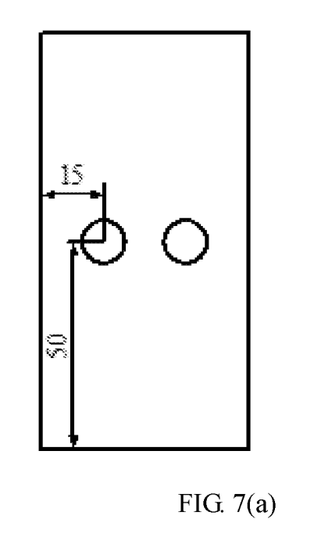
Figure 7B:
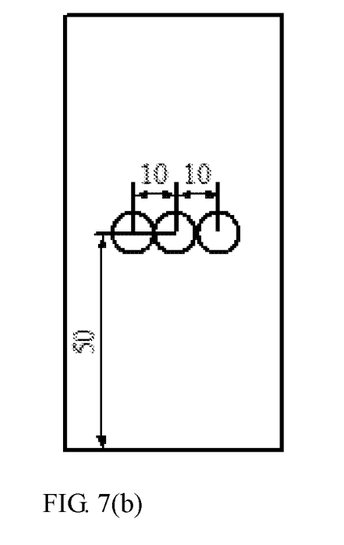
Figure 7C:
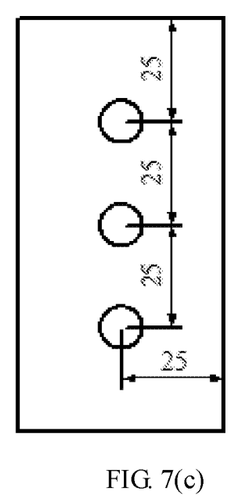
Figure 7D:
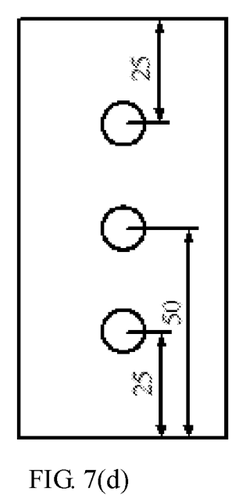
Figure 7E:
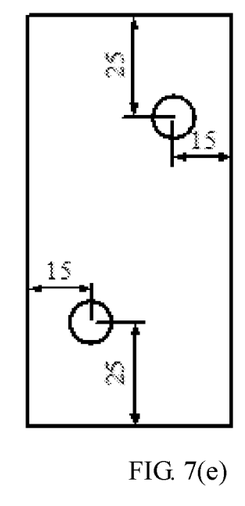
Figure 7F:
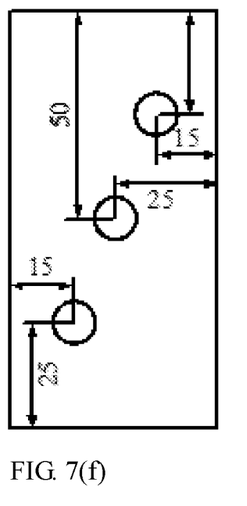
Figure 8:
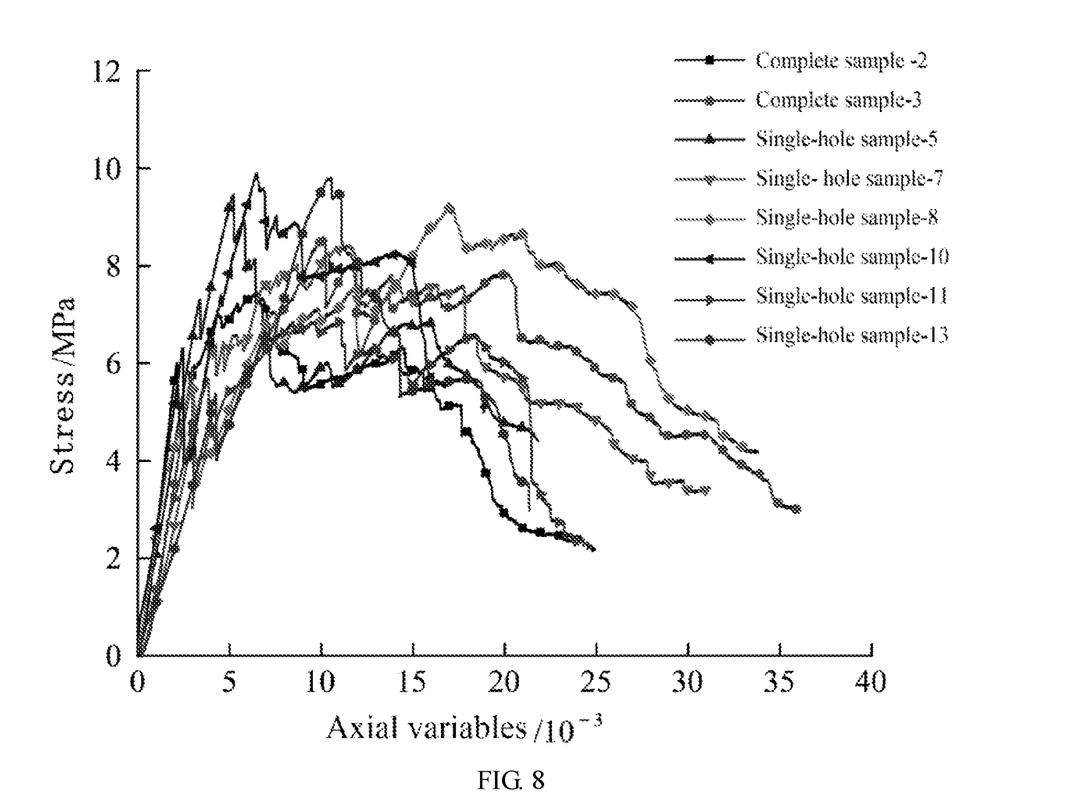
FIG. 8 is a schematic diagram of the stress-strain curve provided by another embodiment of the present application.
Figure 9:
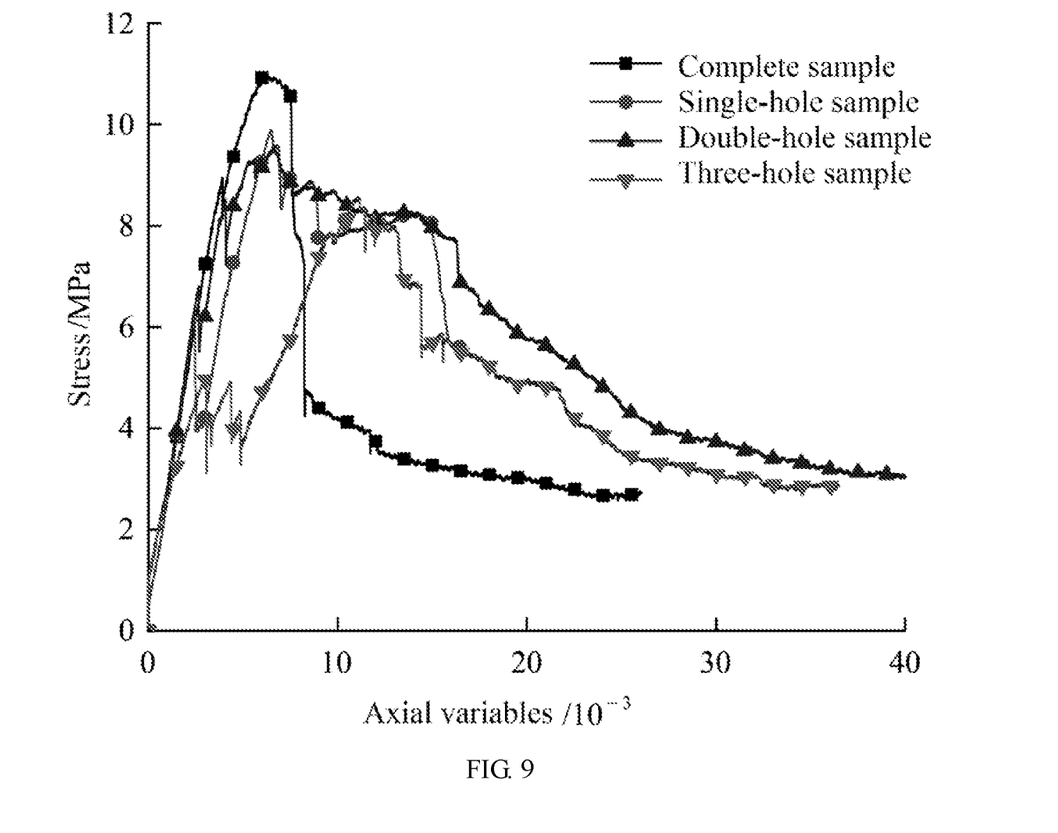
FIG. 9 is a schematic diagram of the mechanical characteristics of the defect consolidation with different numbers of holes provided by the present application.
Figure 10:
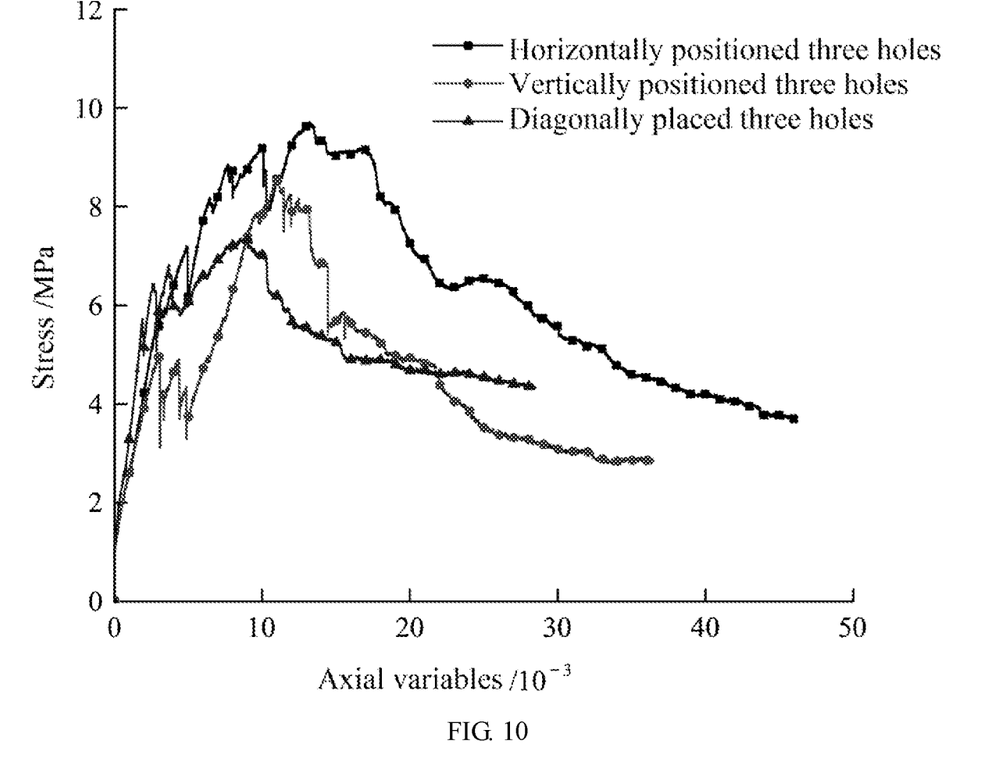
FIG. 10 is a schematic diagram of the mechanical characteristic curve of the relative position of the hole against the defect consolidation provided by the present application.
Figure 11:
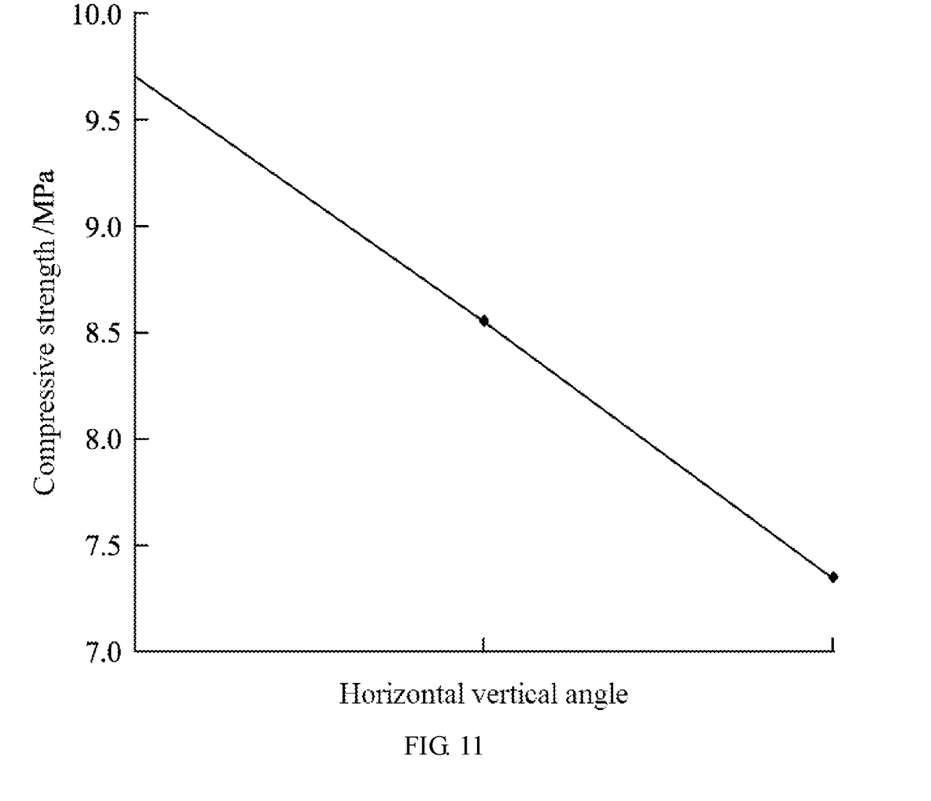
FIG. 11 is a schematic diagram of the comparison of the compressive strength of the effect consolidation with different hole positions provided by the present application.
Figure 12:
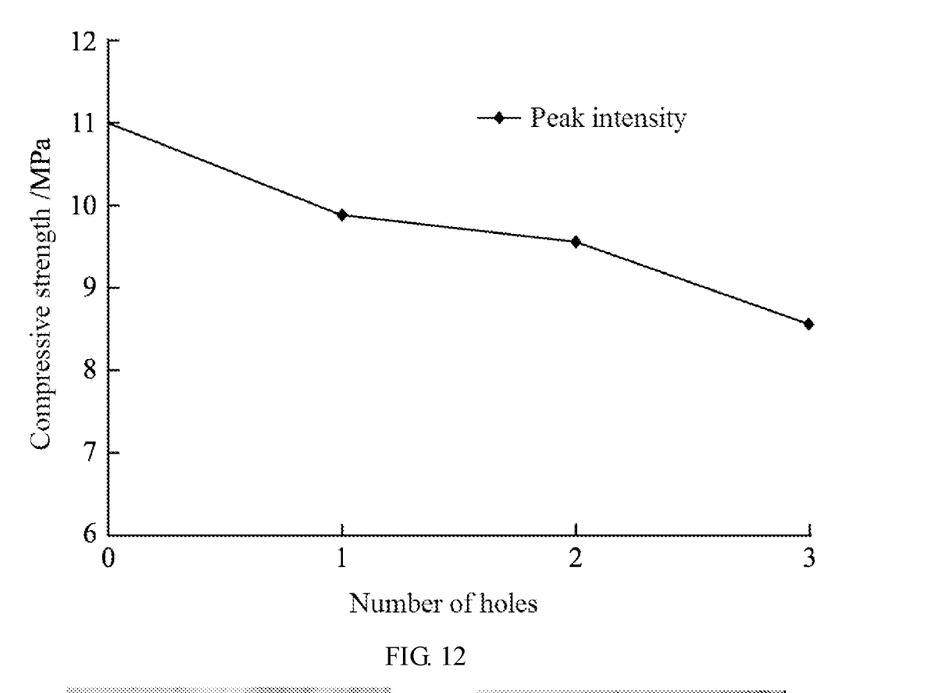
FIG. 12 is a schematic diagram of the compressive strength comparison of a grouting consolidation sample with different numbers of holes provided by the present application.
Figure 13A:
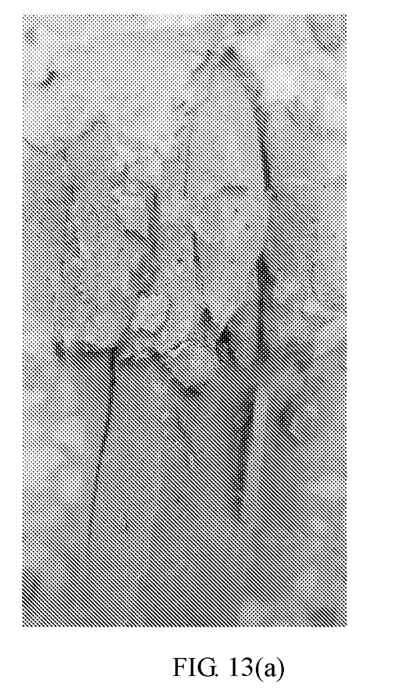
Figure 13B:
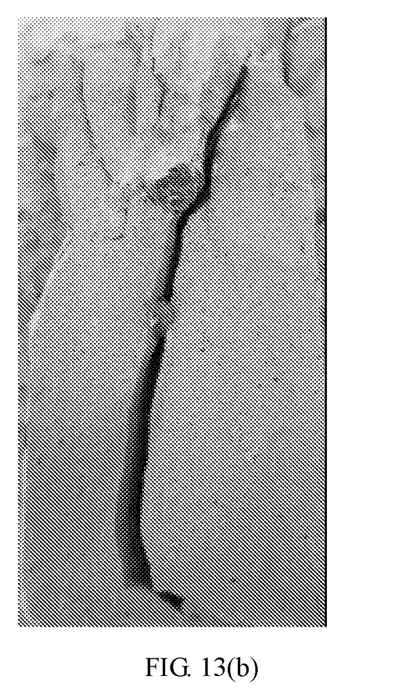
Figure 14A:
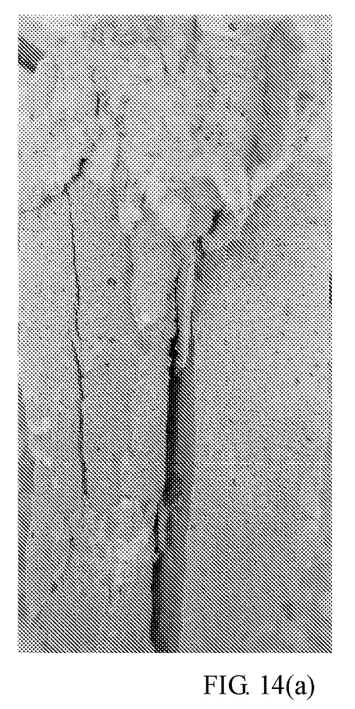
Figure 14B:
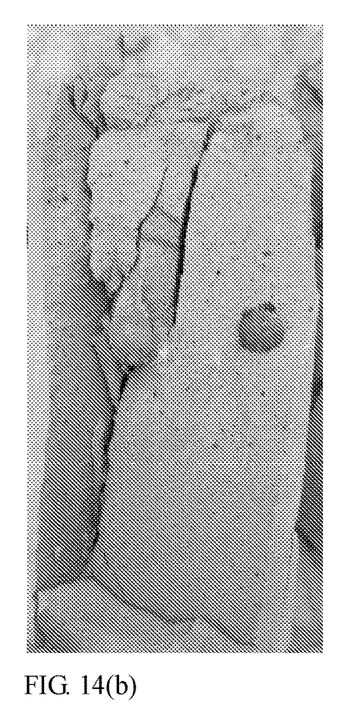
Figure 15A:
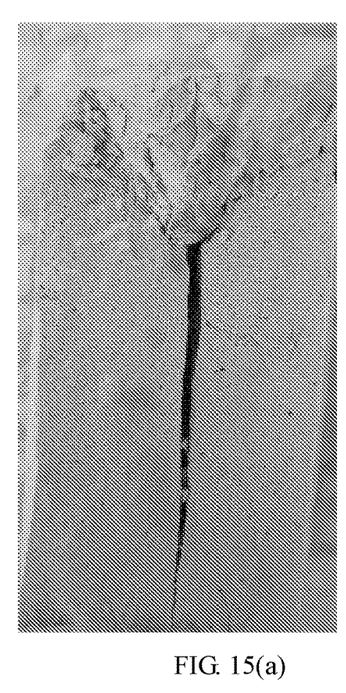
Figure 15B:
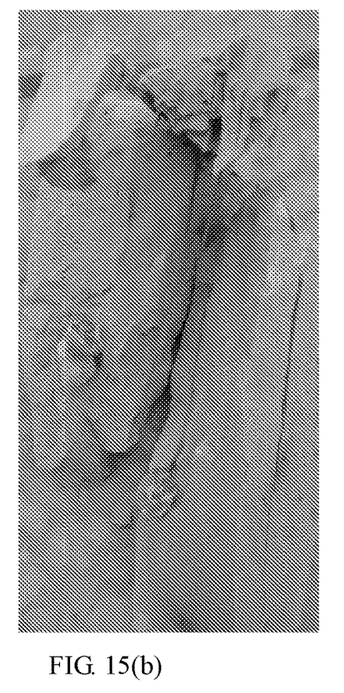

Preparation of porous defect specimens: Based on the design of single-hole specimens and location distribution, the number and relative positions of void defects are increased to study the mechanical properties of cylindrical grouting-consolidated specimens. A total of 21 specimens were cast with porous defect consolidation bodies. The relative positions of the holes are 3 relative positions of the horizontal axis of the cylinder, the vertical axis of the centre of the cylinder, and the oblique line passing through the centre of the cylinder. Three specimens of each state are prepared. 2-10, 2-11, and 2-12 are the samples with 2 hole defects on the horizontal axis, and the hole centre is 10 mm from the centre line of the cylinder as shown in FIG. 7(a); 2-4, 2-Sample No. 5, 2-6 is a sample with 3 hole defects at the horizontal axis, the centre of the hole is located in the centre of the cylinder, and the centre of the outer hole is 10 mm from the centre line, as shown in FIG. 7(b); 2-Nos. 7, 2-8, and 2-9 are samples with 2 holes on the vertical axis, and the distance between the centre of the hole and the nearest end surface is 25 mm, as shown in FIG. 7(c); 2-1, 2-2, No. 2-3 specimens have 3 holes on the vertical axis, one hole is in the centre of the cylinder, and the other 2 holes are at the nearest end face 25 mm, as shown in FIG. 7(d); 2-13, 2-14, 2-15 sample has 2 holes, each hole centre is 10 mm from the centre line and 25 mm from the nearest end face, as shown in FIG. 7(e); 2-16, 2-17, 2-18 Sample No. is a sample with a total of 3 holes passing through the centre of the cylinder with an oblique line of 45°, as shown in FIG. 8(f).

Prepare the corresponding hole wax model according to the test plan and complete the pouring of the grouting consolidation sample. Complete the maintenance in the same environment as the single-hole sample and the wax melting step. Polish both ends of the sample according to the machining accuracy requirements of the test plan. And measure the sample size. The results are shown in Table 2.

TABLE 2

Parameter of porous hole defect sample

| No. | Diameter/mm | Height/mm | Mass/g | Time/d |
|---|---|---|---|---|
| 2-1 | 50.47 | 100.46 | 335.1 | 11 |
| 2-2 | 50.40 | 99.70 | 335.7 | 11 |
| 2-3 | 50.41 | 98.04 | 332.8 | 11 |
| 2-4 | 50.40 | 100.52 | 339.2 | 11 |
| 2-5 | 50.34 | 99.32 | 340.0 | 11 |
| 2-6 | 50.44 | 99.44 | 343.4 | 11 |
| 2-7 | 50.29 | 97.53 | 324.5 | 11 |
| 2-8 | 50.18 | 98.16 | 327.9 | 11 |
| 2-9 | 50.60 | 96.58 | 323.2 | 11 |
| 2-10 | 50.30 | 99.60 | 333.6 | 11 |
| 2-11 | 50.21 | 99.79 | 328.1 | 11 |
| 2-12 | 50.47 | 96.09 | 320.0 | 11 |
| 2-13 | 50.67 | 94.00 | 313.5 | 11 |
| 2-14 | 50.48 | 95.92 | 325.9 | 11 |
| 2-15 | 50.50 | 96.02 | 324.0 | 11 |
| 2-16 | 50.56 | 97.30 | 322.0 | 11 |
| 2-17 | 50.68 | 98.01 | 324.0 | 11 |
| 2-18 | 50.60 | 101.90 | 341.1 | 11 |

Test Results of Porous Defect Samples

During the test, a pressure rate of 0.002 mm/s was maintained. Record the failure process of the compression test. Observe the relative position of the holes in the grouting consolidation sample after failure. The test results and failure morphology are shown in FIG. 8-12, FIG. 13(a), FIG. 13(b), FIG. 14(a), FIG. 14(b), FIG. 15(a), FIG. 15(b).

In the step 5 heating process of the present embodiment, the molten state of paraffin wax is partially absorbed by the casting material (the cement mortar material has a microporous structure inside after solidification) to form defects. Even if it is not completely absorbed, due to low melting point materials such as paraffin wax and grouting, the material properties of the specimens of the consolidated bodies vary greatly, and they can also be used as internal defects for related experimental research.

The embodiment of present application 2, the other parameters and steps are the same as the embodiment of present application 1, that is to say, the low melting point material is replaced with asphalt.

The other parameters and steps of the embodiment of present application 3 are the same as those of the embodiment of present application 1, that is to say, the low melting point material is replaced with rosin.

The above embodiments are only used to illustrate the present application, but not to limit the present application. Although the present application has been described in detail with reference to the embodiments, those of ordinary skill in the art should understand that various combinations, modifications, or equipment substitutions to the technical solutions of the present application do not depart from the spirit and scope of the technical solutions of the present application, and should cover within the claims of the present application.

What is claimed is:

1. A method of preparing a grouting consolidation sample with internal defects, comprising the following steps:
    step 1: using a tool to carve a groove having a shape matching a defect to be prepared on plasticine to form a defect mould, and placing one end of a string at a centre of the groove;
    step 2: heating a low-melting point material to melt, and pouring the melted low-melting point material in liquid form into the groove in the plasticine;
    step 3: after the low-melting point material is cooled and solidified to form a defect model, taking out the defect model with the string, and fixing the defect model onto a casting mould of consolidation using the string;
    step 4: slowly injecting an evenly stirred slurry along an inner edge of the casting mould of consolidation while keeping a position of the defect model unchanged;
    step 5: after the slurry reaches a solidification time to obtain the sample, removing the casting mould of consolidation, and placing the sample into an oven to heat and keep at a temperature above a melting point of the low-melting point material; and
    step 6: taking out the sample and the preparation is finished.

2. The method of claim 1, wherein the said tool is a steel ball, a steel column or a steel sheet.

3. The method of claim 2, wherein the said groove has a shape of a hemisphere, a hemispheric-column combination, a sheet or an irregular groove.

4. The method of claim 1, wherein in step 2, the said low-melting material is contained in a metal container, and the metal container is heated by an alcohol burner to melt the low-meting point material.

5. The method of claim 1, wherein the said low-melting point material has a melting point of 40 degrees centigrade to 90 degrees centigrade.

6. The method of claim 5, wherein the low-melting point material is one or more selected from the group consisting of paraffin, asphalt and rosin.

7. The method of claim 1, wherein in step 5 the oven has a heating temperature of from 100 to 120 degrees centigrade.

8. The method of claim 1, wherein in step 5 the sample is heated for 1 to 6 hours.

9. The method of claim 1, wherein the defect model has an equivalent diameter of 1 to 8 mm.

* * * * *